Figure 1:
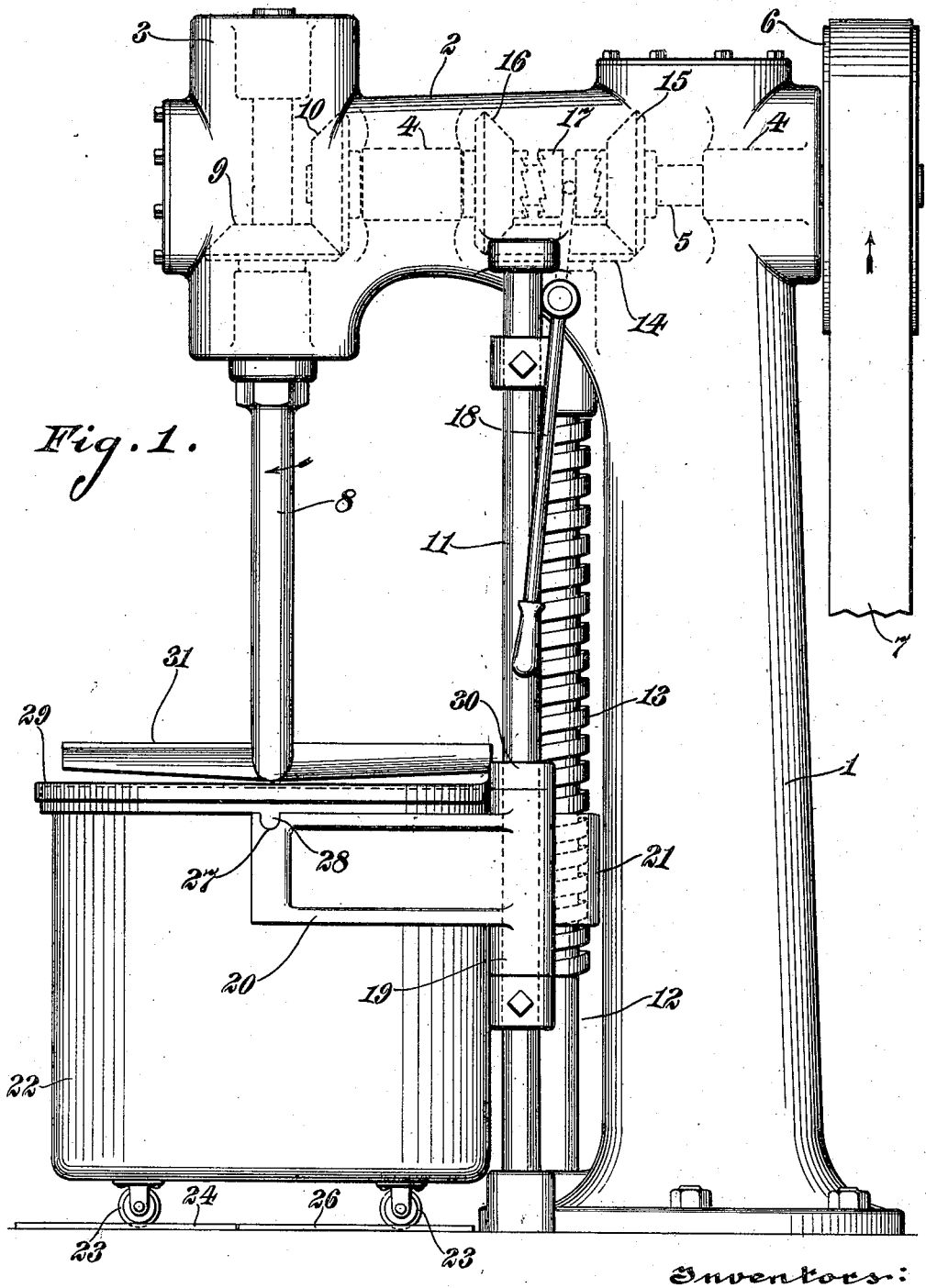

E. & H. HEIDLAND.
DOUGH PUNCHING MACHINE.
APPLICATION FILED NOV. 22, 1915.

1,203,734.

Patented Nov. 7, 1916.
3 SHEETS—SHEET 3.

Inventors:
ERNEST HEIDLAND AND HERMAN HEIDLAND,
Their Attorney.

UNITED STATES PATENT OFFICE.

ERNEST HEIDLAND AND HERMAN HEIDLAND, OF ST. LOUIS, MISSOURI.

DOUGH-PUNCHING MACHINE.

1,203,734.    Specification of Letters Patent.    Patented Nov. 7, 1916.

Application filed November 22, 1915. Serial No. 62,904.

*To all whom it may concern:*

Be it known that we, ERNEST HEIDLAND and HERMAN HEIDLAND, both citizens of the United States, and residing at St. Louis, in the State of Missouri, have invented a certain new and useful Improvement in Dough-Punching Machines, of which the following is a specification.

This invention relates to a dough punching mechanism, being directed especially to the punching machine included in and forming a part of said mechanism.

Among bread making processes the two processes most extensively practised, are what are known as the sponge and dough method and the off-hand or straight dough process. Of these the former consists in setting a sponge containing all of the ingredients except a part of the flour and water, which are added later in the operation of doughing up the sponge, after fermentation. This method which was formerly almost universally adopted, consumes about twelve hours from sponge to dough, and has, therefore, been rapidly supplanted by the straight dough process, under which the whole of the ingredients are brought together and made into a dough in one operation, with a resultant saving of from six to seven hours in time. Operating under this later process, which requires the use of a somewhat greater proportion of yeast than the sponge and dough method, the whole of the ingredients are brought together and mixed by suitable machinery and thereafter allowed to ferment or rise, it having been found that during this period of fermentation, the ferment gases tend to collect and become imprisoned at the bottom of the dough, and that the latter must, therefore, be punched at intervals in order to free these imprisoned gases and cause them to properly spread through and aerate the entire mass of dough.

Heretofore it has been the practice to discharge the dough from the mixer into open troughs and to effect the punching operation, which consists in working up the dough from the bottom and turning over and exposing the bottom layers, by hand. This is a highly unsanitary practice, in that it necessitates the workmen bending over these open troughs and inserting their hands and arms into the dough for working it at the bottom. Furthermore, this practice of hand punching makes highly possible an insufficient working of the dough, to fully liberate all of the confined gases, and consequently is liable to result in the bread being sour or otherwise impaired.

The present invention has among its objects, therefore, to overcome the prevailing unsanitary practice of hand punching the dough by providing a punching mechanism whereby this operation may be carried out in a thoroughly clean and satisfactory manner.

A further object is to provide for a more rapid and complete punching of the dough, than heretofore, resulting in the ferment gases more effectually permeating and aerating the dough.

With these and other objects in view, the invention comprises the novel features of construction and combination of parts more fully hereinafter described.

Figure 2:
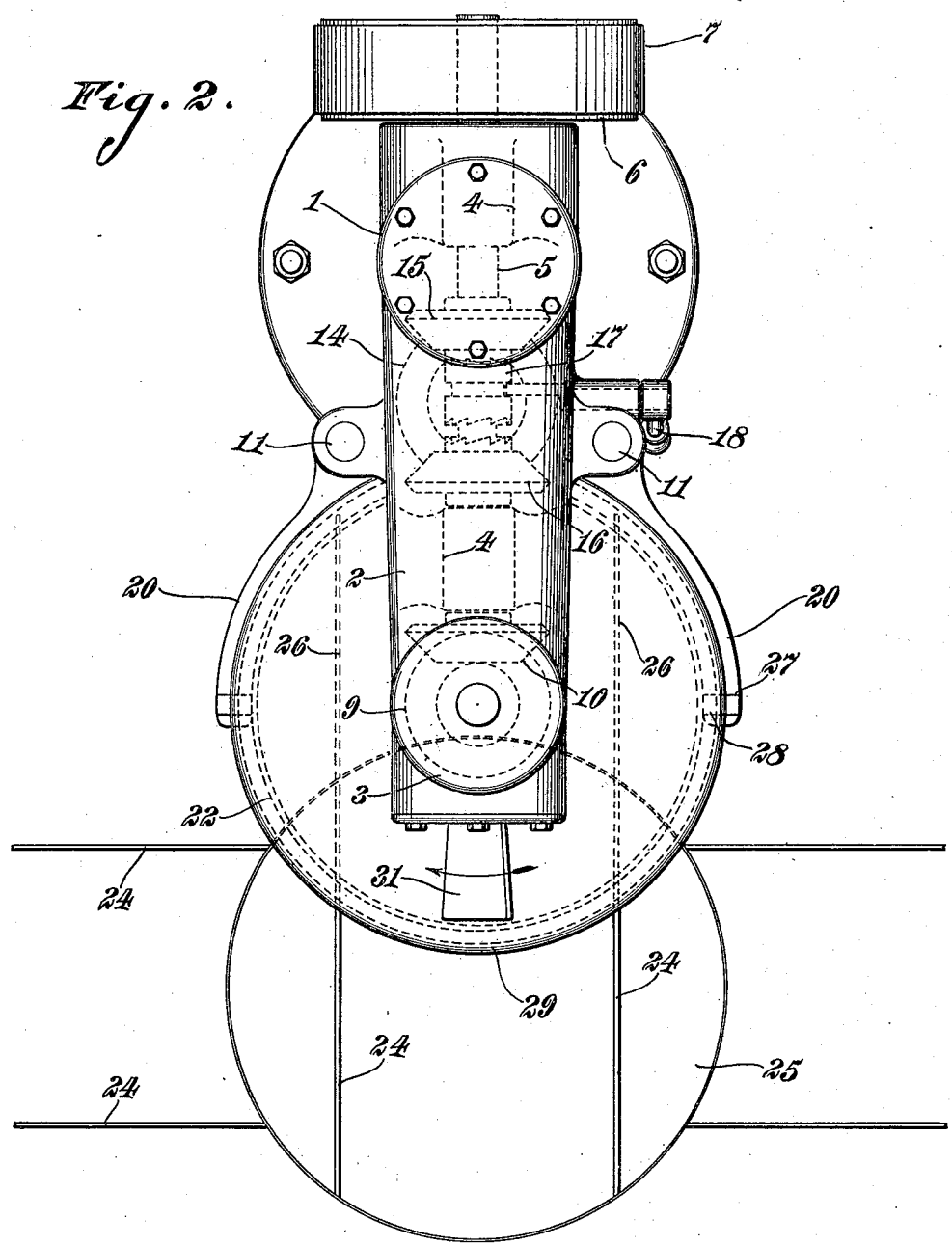
Figure 3:
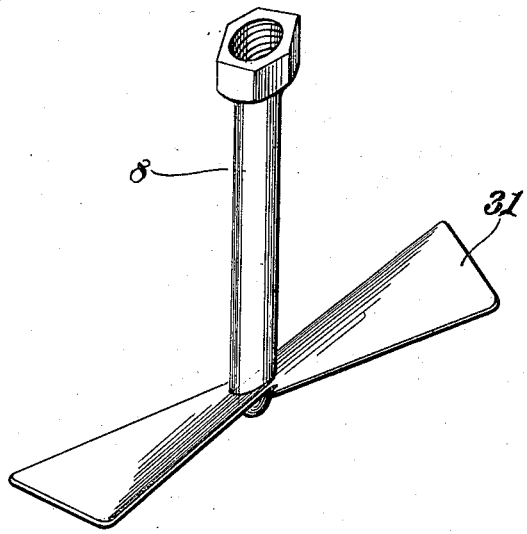
Figure 4:
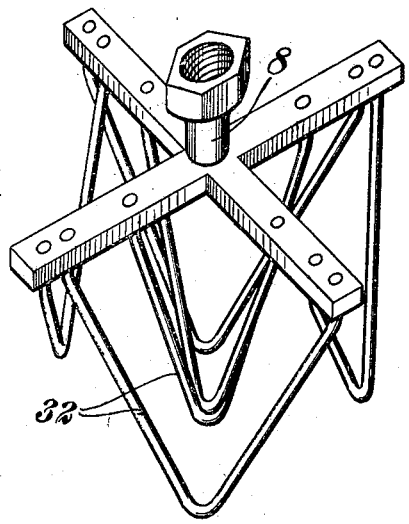

In the accompanying drawings, Figure 1 is a side elevation of a dough punching mechanism embodying the invention; Fig. 2 is a top plan view of the same; Fig. 3 is a perspective of the punching tool; and Fig. 4 is a similar view of the mixing tool.

Referring to the drawings it will be seen that the machine embodies a hollow frame comprising a vertical standard 1 provided at its upper end with an overhanging horizontal portion or arm 2 terminating at its outer end in a journal boss 3, said arm being provided with suitably spaced internal bearings 4 for a horizontal drive shaft 5, whose rear end is equipped with a pulley 6 adapted to receive a drive belt 7, while journaled in bearings in the boss 3 is a vertical driven shaft 8 on which is fixed a bevel gear 9 in mesh with a corresponding gear 10 on the forward end of shaft 5.

Terminally mounted and sustained at the front of the frame standard 1 is a pair of vertical guide rods 11, and a rotary feed shaft 12 having a feed screw or worm 13, and equipped at its upper end with a bevel gear 14 in mesh with a pair of corresponding gears 15—16 idly mounted on the shaft 5, on which there is also mounted a shiftable clutch member or head 17 arranged between said gears and to be thrown into touching engagement with either, at will, by means of a shifting lever 18 pivotally sustained on the frame and having the usual pin and groove connection with the head 17 adapting the latter for free rotation with the shaft 5 to which it is fixed.

Mounted for vertical movement upon the guide rods 11 is a head or yoke 19 provided with a pair of supporting arms 20 and with a central tubular portion or boss 21 internally threaded for engagement with the feed screw 13, whereby operation of the latter will cause the head to feed upward or downward, as the case may be, upon the guides 11.

The mechanism of the invention includes, for use with the machine, a dough receiving tub or vessel 22 equipped with suitable wheels 23 adapting it for travel upon the rails 24 of a track or way running past the machine, and provided at a point in advance of the latter, with a turn table 25 by which the tub may be switched on to branch rails 26 for movement to a position between the arms 20, which are curved to conform to said tub and are provided with bearing recesses 27 adapted to receive trunnions 28 with which the tub is equipped. The tub may be closed by means of a sectional cover, whose sections 29 are pivotally sustained each by means of a bearing ear 30 provided thereon and engaged with one of the rods 11.

The shaft 8 carries a suitable dough working tool, removably attached to the lower end of the shaft, and this tool will be either in the form of a dough punching blade 31, as shown in Figs. 1 and 3, or a dough mixing tool or beater 32, as illustrated in Fig. 4, it being understood that the tools 31 and 32 may be interchanged according to the nature of the treatment to which the dough is to be subjected.

In practice and operating under the off-hand or straight dough process the whole of the ingredients may be introduced into and mixed directly in the tub or container 22, in one operation, to which end the described machine may be utilized by substituting the mixing tool or beater 32 for the punching tool 31. It is to be understood, however, that any suitable machine may be employed for mixing the ingredients and after being mixed, the dough may be discharged from such mixer into one of the tubs 22, a number of which will be included in the practical equipment.

After having been thus prepared and during the period of fermentation, the dough is allowed to remain in the tub, and when it becomes necessary to punch the dough in order to liberate the ferment gases, the tub is brought to a position for its contents to be acted upon by the machine, it being understood that, during this punching operation, the machine will be equipped with the punching tool 31, and that the tub will be closed by the cover 29. In order to properly effect the punching operation, the tool 31 is rotated and also caused to travel up and down through the dough in the tub 22, this latter movement of the tool through the dough being preferably attained by moving the tub vertically up and down relative to the shaft 8. To this end, during rotation of the tool carrying shaft 8, which is driven from the power shaft 5 through the medium of the intermeshing gears 9 and 10, the lever 18 is manipulated for bringing the clutch member 17 alternately into clutching engagement with the gears 15 and 16, whereby said gears are alternately rendered active upon the gear 14 to reverse the direction of rotation of shaft 12, as will be readily understood. During rotation of the shaft 12 in one direction, say, while the gear 15 is held in action by the clutch, shaft 12 will be rotated to the left and the screw 13 operating in the part 21, will feed the head or yoke 19 upward on the guide rods 11, carrying with it the tub 22 supported on the arms 20 of said yoke, while reverse rotation of the shaft 12, resulting from clutching gear 16 to the shaft 5, will operate the screw 13 for feeding the yoke and, therefore, the tub 22 downward. It will be noted that the punching tool is shaped like a propeller blade, and that it has its forward edge bent up. This causes the tool to cut through the dough as it rises, thereby cutting a wide channel through the dough so as to furnish a means for the discharge of the waste gases, as well as an aerating of the dough. In this machine, therefore, the punching operations will be performed for the same purpose as formerly by hand, but more thoroughly and in a more sanitary manner.

In our copending application, filed of even date herewith, Serial Number 62,903, we have described and claimed a novel system of making dough involving the use of this machine, both as a mixer and as a punching mechanism. It should be understood that the operation of the machine may be controlled in the manner explained whether for mixing or punching the dough.

From the foregoing, it is apparent that the invention accomplishes its stated objects and it is to be understood that in attaining these ends the mechanism is not restricted to the details of construction and operation herein disclosed, as various minor changes may be made therein without departing from the spirit or scope of the invention. For example, while stress is laid upon the operation of the mechanism in connection with the off-hand or straight dough process, it is obvious that in so far as the dough punching feature is concerned, the mechanism is equally applicable to other bread making processes involving the use of a ferment.

Having thus described the invention, what is claimed is:

1. A dough punching mechanism, comprising a dough receiving tub, a dough punching tool constructed and arranged to operate on fermented dough within said tub, and means for operating said punching tool.

2. A dough punching mechanism, comprising a dough receiving tub, a dough punching tool constructed and arranged to operate on fermented dough within said tub, and means for imparting rotary and reciprocatory motions to said tool and tub relatively.

3. A dough punching mechanism, comprising a dough receiving tub, a dough punching tool constructed and arranged to operate on fermented dough within said tub, and means for imparting a combined rotary and reciprocatory motion to said tool and tub relatively.

4. A dough punching mechanism, comprising a dough receiving tub, a driven shaft, a punching tool carried thereby and adapted to operate on fermented dough within said tub, and means for rotating said shaft and causing relative reciprocation of the latter and tub.

5. A dough punching mechanism, comprising a dough receiving tub, a machine embodying a driven shaft, a punching tool removably mounted on said shaft and adapted to operate within said tub, a cover for said tub movably mounted on said machine, means for holding the tub in operative relation to said machine, and means for operating said shaft.

6. A dough punching mechanism, comprising a dough punching machine constructed and arranged for punching fermented dough, and a dough receiving tub adapted to be positioned for its contents to be acted upon by said punching machine.

7. A dough punching mechanism, comprising a dough punching tool adapted for punching fermented dough, and means for operating said tool constructed and arranged to cause it to liberate the gases from and aerate the dough.

8. A dough punching mechanism, comprising a dough punching tool adapted for punching fermented dough, and means for operating said tool constructed and arranged to cause it to cut a continuous channel through the dough.

9. A dough punching mechanism, comprising a dough punching tool adapted for punching fermented dough, and means for operating said tool constructed and arranged to cause it to work the dough from the bottom to the top.

10. A dough punching mechanism, comprising a dough punching tool adapted for punching fermented dough, and means for operating said tool constructed and arranged to cause it to cut a continuous channel through the dough from the bottom to the top.

In testimony whereof we affix our signatures this 18th day of October, 1915.

ERNEST HEIDLAND.
HERMAN HEIDLAND.

Copies of this patent may be obtained for five cents each, by addressing the "Commissioner of Patents, Washington, D. C."